United States Patent Office 3,371,107
Patented Feb. 27, 1968

3,371,107
PESTICIDAL COMPOUNDS AND THEIR USE
Joseph F. De Gaetano, Montvale, N.J., assignor to Tenneco Chemicals, Inc., a corporation of Delaware
No Drawing. Filed Nov. 12, 1964, Ser. No. 410,733
7 Claims. (Cl. 260—465)

ABSTRACT OF THE DISCLOSURE

Cyanoalkyl esters having the formula

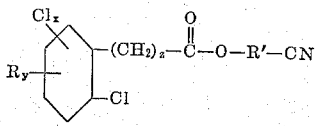

wherein R is a nitro, amino, methyl or methoxy group; R' is an alkylene group having from 2 to 6 carbon atoms; $x$ is an integer in the range of 1 to 4; and $y$ and $z$ are either zero or 1 are useful as pesticidal compounds. They are particularly valuable as selective herbicides since they have a spectrum of activity that is quite different from that of the acids from which they are derived. Illustrative of these compounds are β-cyanoethyl 2,3,6-trichlorobenzoate, α-cyanoisopropyl 2,6 - dichlorobenzoate, and β-cyanoethyl 2,3,6-trichlorophenylacetate.

---

This invention relates to novel pesticidal compounds. More particularly it relates to cyanoalkyl esters of substituted benzoic acids and phenylacetic acids and to their use in the control of undesirable organisms.

In accordance with this invention, it has been found that certain cyanoalkyl esters of polychlorobenzoic acids and polychlorophenylacetic acids have unusual activity as herbicides, as miticides, and as fungicides. These compounds are particularly valuable as selective herbicides and can be advantageously used to control the growth of weeds in an area containing a crop. It has been found that each of these cyanoalkyl esters has a spectrum of herbicidal activity that is quite different from and not logically predictable from the known herbicidal properties of the acid from which it is derived. Thus, the cyanoalkyl esters of 2,3,6-trichlorobenzoic acid can be used to control weed growth without having an adverse effect on the growth of crops in the area, whereas 2,3,6-trichlorobenzoic acid and its previously known esters, such as the alkyl and hydroxyalkyl esters, do not exhibit this selectivity and cannot ordinarily be used to control the growth of weeds in various crops because of their serious damaging effect on these crops.

The pesticidal compounds of this invention may be represented by the structure

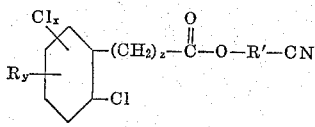

wherein R represents a nitro, amino, lower alkyl, or lower alkoxy group; R' represents a straight-chain or branched-chain alkylene group having from 2 to 6 carbon atoms; $x$ represents an integer in the range of 1 to 4; and $y$ and $z$ represent integers in the range of zero to 1.

The preferred compounds for use as pesticides are those having chlorine atoms in the 2- and 6-positions of the aromatic ring. Particularly preferred are those compounds having chlorine atoms in the 2-, 3-, and 6-positions of the aromatic ring and optionally one of the aforementioned R substituents in the 5-position of the ring and having two or three carbon atoms in the cyanoalkyl group. Illustrative of these compounds are the following:

β-cyanoethyl 2,6-dichlorobenzoate,
β-cyanoethyl 2-methyl-3,6-dichlorobenzoate,
β-cyanoethyl 2,3,6-trichlorobenzoate,
β-cyanoethyl 2,3,6-trichloro-5-aminobenzoate,
β-cyanoethyl 2-methoxy-3,5,6-trichlorobenzoate,
β-cyanoethyl 2,6-dichlorophenylacetate,
β-cyanoethyl 2,3,6-trichloro-5-aminophenylacetate,
α-cyanoisopropyl 2,3,6-trichlorobenzoate,
α-cyanoisopropyl 2,3,5,6-tetrachlorobenzoate,
α-cyanoisopropyl 2,3,6-trichloro-5-nitrobenzoate,
α-cyanoisopropyl 2-methyl-3,6-dichlorophenylacetate,
α-cyanoisopropyl 2,3,6-trichloro-5-nitrophenylacetate,
cyanoisobutyl 2,3,6-trichlorobenzoate,
cyanobutyl 2,3,5,6-tetrachlorobenzoate,
cyanohexyl 2,3,6-trichlorophenylacetate,
cyanohexyl 2,3,4,5,6-pentachlorophenylacetate,
and the like.

These compounds may be prepared by any convenient procedure. Excellent results have been obtained by reacting the appropriate acid chlorides and hydroxyalkyl nitrile.

While the cyanoalkyl esters of this invention can be used as such in the control of the growth of undesirable organisms, they are usually and preferably used in combination with an inert carrier which facilitates the dispensing of dosage quantities of the compounds and assists in its absorption by the organism whose growth is to be controlled. These compounds may be mixed with or deposited upon inert particulate solids, such as fuller's earth, talc, diatomaceous earth, hydrated calcium silicate, kaolin, and the like to form dry particulate compositions. Such compositions may, if desired, be dispersed in water with or without the aid of a surface-active agent. The cyanoalkyl esters are preferably dispensed in the form of solutions or dispersions in inert organic solvents, water, or mixtures of inert organic solvents and water, or as oil-in-water emulsions. The concentration of the cyanoalkyl ester in the pesticidal compositions may vary within wide limits and depends upon a number of factors, the most important of which are the type or types of organisms being treated and the amount of the composition to be applied per unit of area. In most cases the compositions contain approximately 0.1% to 85% by weight of the pesticidal compound. If desired, mixtures of two or more of the novel compounds may be present in the compositions. These compounds can also be used advantageously in combination with other pesticidal compounds, such as 2,4-dichlorophenoxyacetic acid, its esters, or salts; 4-chloro-2-methylphenoxyacetic acid, its esters, or salts; N,N-diallyl-α-chloroacetamide, ethyl N,N-di-n-propylthiocarbamate, 2 - chloroallyl diethyldithiocarbamate, and the like.

This invention is further illustrated by the examples that follow. It is to be understood that the examples are given merely for the purpose of illustration and that the invention is not limited to any material or condition mentioned therein except as set forth in the appended claims.

Example 1

To a mixture of 14.9 grams (0.21 mole) of β-hydroxy-propionitrile and 32 grams (0.4 mole) of pyridine at 20°–25° C. was added 42 grams (0.2 mole) of 2,6-dichlorobenzoyl chloride over a period of 20 minutes. The reaction mixture was heated at 70°–80° C. for 75 minutes, cooled, and poured into 500 ml. of water. An amber oil separated which solidified on standing. This product was washed with ether, with two 100 ml. portions of 3.5% hydrochloric acid, with three 100 ml. portions of water, and then dried. There was obtained 43.5 grams of β-cyanoethyl 2,6-dichlorobenzoate, which contained 29.2% Cl and 5.39% N (Calculated for $C_{10}H_7Cl_2NO_2$, 29.1% Cl and 5.74% N).

*Example 2*

To a mixture of 21.3 grams (0.3 mole) of β-hydroxypropionitrile and 48 grams (0.6 mole) of pyridine at 20°–25° C. was added 73.2 grams (0.3 mole) of 2,3,6-trichlorobenzoyl chloride over a period of 25 minutes. The reaction mixture was heated at 70°–78° C. for 1 hour and cooled to room temperature. Water was added to bring the volume of the reaction mixture to 550 ml. The organic layer that separated was isolated and allowed to solidify. It was washed with two 100 ml. portions of 3.5% hydrochloric acid and with five 100 ml. portions of water and then dried. There was obtained 71.3 grams of β-cyanoethyl 2,3,6-trichlorobenzoate, which melted at 68°–70° C. and which contained 39.4% Cl and 4.9% N (calculated for $C_{10}H_6Cl_3NO_2$, 38.25% Cl and 5.15% N).

*Example 3*

To a mixture of 13.6 grams (0.182 mole) of β-hydroxypropionitrile and 34 grams of pyridine at 20°–25° C. was added 47 grams (0.182 mole) of 2,3,6-trichlorophenylacetyl chloride over a period of 30 minutes. The reaction mixture was stirred at 25° C. for four hours and then filtered. The filtrate was dissolved in benzene, and the solution was washed with 50 ml. of water, with 50 ml. of 3% sodium hydroxide solution, and finally with two 50 ml. portions of water. Following the removal of benzene by distillation under reduced pressure, there was obtained 36 grams of β-cyanoethyl 2,3,6-trichlorophenylacetate, which had a saponification number of 230.2 and which contained 34.6% Cl and 4.4% N (calculated for $C_{11}H_8Cl_3O_2N$, 36.5% Cl and 4.8% N).

*Example 4*

A mixture of 26 grams (0.5 mole) of 2,6-dichlorobenzoyl chloride and 26 grams (0.6 mole) of α-hydroxybutyronitrile was heated at its reflux temperature for several hours. After cooling, the reaction mixture was washed with water and then allowed to separate into an organic layer and an aqueous layer. The organic layer was dissolved in 200 ml. of methylene chloride. This solution was washed with two 100 ml. portions of 10% sodium hydroxide solution and then with two 100 ml. portions of water and dried over calcium chloride. Following removal of the methylene chloride by distillation under reduced pressure, the crude product was recrystallized from an ethanol-water mixture and dried. There was obtained 20 grams of α-cyanoisopropyl 2,6-dichlorobenzoate, which contained 27.50% Cl and 5.25% N (calculated for $C_{11}H_9Cl_2NO_2$, 27.75% Cl and 5.28% N).

*Example 5*

A mixture of 123 grams (0.5 mole) of 2,3,6-trichlorobenzoyl chloride and 26 grams (0.6 mole) of α-hydroxybutyronitrile was heated at its reflux temperature for several hours and cooled to room temperature. The product was isolated from the reaction mixture by the procedure described in Example 4. There was obtained 24 grams of α-cyanoisopropyl 2,3,6-trichlorobenzoate, which contained 36.4% Cl and 4.78% N (calculated for $C_{11}H_8Cl_3NO_2$ 36.7% Cl and 4.65% N).

*Example 6*

Groups of greenhouse flats containing soil were planted with seeds of various crop and weed species. In the pre-emergence tests, the flats were sprayed with a 0.3% solution in benzene of one of the products of this invention. In the postemergence tests, the plants were sprayed with the same solution 2 to 4 weeks after planting. The solutions were applied to the soil or to the plants at the rate of 10 pounds of the herbicidal compound per acre. In each case the results were observed 2 weeks after the application of the herbicidal composition. In the table that follows the effectiveness of the herbicidal compounds as determined by comparison with untreated plantings is indicated by the numbers "0" through "10" in increasing order of effectiveness. Thus "0" indicates no herbicidal acitvity; "1" to "3," slight injury; "4" to "6," moderate injury; "7" to "9," severe injury; and "10," destruction of all plants.

COMPOUND

| | β-Cyanoethyl 2,3,6-trichlorophenylacetate | | β-Cyanoethyl 2,3,6-trichlorobenzoate | | α-Cyanoisopropyl 2,6-dichlorobenzoate | | α-Cyanoisopropyl 2,3,6-trichlorobenzoate | |
|---|---|---|---|---|---|---|---|---|
| Emergence | Pre | Post | Pre | Post | Pre | Post | Pre | Post |
| Plant Species: | | | | | | | | |
| Corn | 2 | 5 | 0 | 0 | 0 | 4 | 0 | 0 |
| Wheat | 3 | 2 | 0 | 0 | 8 | 0 | 10 | 0 |
| Oats | 3 | 4 | 0 | 0 | 10 | 0 | 10 | 0 |
| Soybeans | 9 | 9 | 0 | 10 | 8 | 8 | 10 | 8 |
| Beets | 9 | 8 | 7 | 8 | 0 | 8 | 10 | 10 |
| Clover | 10 | 7 | 10 | 10 | ---- | ---- | ---- | ---- |
| Cucumber | ---- | ---- | ---- | ---- | 8 | 8 | 10 | 10 |
| Foxtail | 9 | 7 | 10 | 0 | 7 | 0 | 0 | 0 |
| Ryegrass | 9 | 5 | 0 | 0 | 0 | 0 | 0 | 0 |
| Timothy | ---- | ---- | ---- | ---- | 7 | 0 | 10 | 0 |
| Mustard | 10 | 9 | 10 | 10 | 5 | 5 | 10 | 8 |
| Buckwheat | 0 | 8 | 10 | 8 | 0 | 3 | 0 | 3 |
| Morning Glory | 0 | 9 | 10 | 10 | 5 | 8 | 0 | 10 |
| Crabgrass | 10 | 8 | 7 | 0 | ---- | ---- | ---- | ---- |

*Example 7*

Lima bean plants infested with adult strawberry spider mites (*Tetranychus atlanticus*) were dipped into a solution containing 0.35% by weight of α-cyanoisopropyl 2,6-dichlorobenzoate. Five days after this treatment, 66% mortality of the mites was observed.

I claim:
1. A compound having the structure

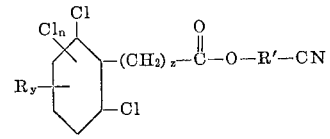

wherein R represents a nitro, amino, methyl, or methoxy group; R′ represents an alkylene group having from 2 to 6 carbon atoms; n represents an integer in the range of zero to 3; and y and z represent integers in the range of zero to 1.
2. β-Cyanoethyl 2,6-dichlorobenzoate.

3. β-Cyanoethyl 2,3,6-trichlorobenzoate.
4. β-Cyanoethyl 2,3,6-trichlorophenylacetate.
5. α-Cyanoisopropyl 2,6-dichlorobenzoate.
6. α-Cyanoisopropyl 2,3,6-trichlorobenzoate.
7. α-Cyanoisopropyl 2,3,6-trichlorophenylacetate.

References Cited

UNITED STATES PATENTS

| | | | |
|---|---|---|---|
| 2,394,916 | 2/1946 | Jones | 71—2.6 |
| 2,726,947 | 12/1955 | Baumgartner | 71—2.6 |
| 2,734,070 | 2/1956 | Blair | 260—465 |
| 2,734,071 | 2/1956 | Blair | 260—465 |
| 2,759,963 | 8/1956 | Blair | 260—465 |
| 2,977,212 | 3/1961 | Tischler | 71—2.6 |
| 3,013,056 | 12/1961 | Richter | 260—465 |

JOSEPH P. BRUST, *Primary Examiner.*